US011056967B2

(12) United States Patent
Schult et al.

(10) Patent No.: US 11,056,967 B2
(45) Date of Patent: Jul. 6, 2021

(54) ELECTRICAL SUPPLY SYSTEM FOR AN AIRCRAFT WITH A LEGACY AC NETWORK AND A BIPOLAR DC NETWORK

(71) Applicants: AIRBUS OPERATIONS GMBH, Hamburg (DE); AIRBUS DEFENCE AND SPACE GMBH, Taufkirchen (DE); AIRBUS OPERATIONS SL, Getafe (ES)

(72) Inventors: Jens Schult, Hamburg (DE); Jörg Wangemann, Magdeburg (DE); Leire Segura Martinez De Ilarduya, Vitoria-Gasteiz (ES)

(73) Assignee: AIRBUS OPERATIONS GMBH, Hamburg (DE)

( * ) Notice: Subject to any disclaimer, the term of this patent is extended or adjusted under 35 U.S.C. 154(b) by 491 days.

(21) Appl. No.: 15/940,412

(22) Filed: Mar. 29, 2018

(65) Prior Publication Data
US 2018/0287482 A1 Oct. 4, 2018

(30) Foreign Application Priority Data
Mar. 30, 2017 (DE) .......................... 102017106924.0

(51) Int. Cl.
*H02M 1/10* (2006.01)
*B60R 16/03* (2006.01)
(Continued)

(52) U.S. Cl.
CPC ............... *H02M 1/10* (2013.01); *B60R 16/03* (2013.01); *H02J 3/36* (2013.01); *H02J 3/38* (2013.01);
(Continued)

(58) Field of Classification Search
CPC ............ H02M 1/10; H02M 1/14; H02M 7/06; H02M 7/487; H02M 7/797; B60R 16/03;
(Continued)

(56) References Cited

U.S. PATENT DOCUMENTS 4,967,132 A * 10/1990 Rozman ................... F02N 11/04
                                                                318/723
5,406,470 A *  4/1995 Ridley .................... H02M 3/285
                                                                323/207
(Continued)

FOREIGN PATENT DOCUMENTS

DE       102013209544 A1    11/2014

OTHER PUBLICATIONS

Komovskiy, "Comparative analysis of three-level PWM inverters for aircraft AC power systems," Conference: 2016 17th International Conference of Young Specialists on Micro/Nanotechnologies and Electron Devices (EDM) held on Jun. 30-Jul. 4, 2016, at Erlagol, Russia, Electronic ISBN: 978-1-5090-0786-8, pp. 476-480.
(Continued)

*Primary Examiner* — Rexford N Barnie
*Assistant Examiner* — Kalu Kelly Emeaba
(74) *Attorney, Agent, or Firm* — Greer, Burns & Crain, Ltd.

(57) ABSTRACT

An electrical supply system for an aircraft includes a generator having a neutral point, an AC network, a bipolar DC network, and a neutral point clamped converter. The neutral point is connected to ground, in at least one operating mode. The converter has an AC side with AC connectors couplable with at least one phase of the generator. The converter also has a DC side with a first DC connector, a second DC connector and a neutral DC connector. The AC side of the converter is coupled with the generator, the DC side is coupled with the bipolar DC network, and the neutral DC
(Continued)

connector is connected to ground. The convertor provides a DC voltage on the DC side upon receiving an AC voltage on the AC side, and provides an AC voltage on the AC side upon receiving a DC voltage on the DC side.

8 Claims, 3 Drawing Sheets

(51) Int. Cl.
| | | |
|---|---|---|
| H02J 3/38 | (2006.01) | |
| H02J 5/00 | (2016.01) | |
| H02M 7/06 | (2006.01) | |
| H02M 7/797 | (2006.01) | |
| H02M 1/14 | (2006.01) | |
| H02M 7/487 | (2007.01) | |
| H02J 4/00 | (2006.01) | |
| H02J 3/36 | (2006.01) | |

(52) U.S. Cl.
CPC ............... *H02J 4/00* (2013.01); *H02J 5/00* (2013.01); *H02M 1/14* (2013.01); *H02M 7/06* (2013.01); *H02M 7/487* (2013.01); *H02M 7/797* (2013.01); *B64D 2221/00* (2013.01)

(58) Field of Classification Search
CPC ........ H02J 3/36; H02J 3/38; H02J 4/00; H02J 5/00; B64D 2221/00
See application file for complete search history.

(56) References Cited

U.S. PATENT DOCUMENTS

| | | | | |
|---|---|---|---|---|
| 5,587,641 | A * | 12/1996 | Rozman | F02N 11/04 318/400.12 |
| 7,920,393 | B2 * | 4/2011 | Bendre | H02M 7/487 363/127 |
| 9,837,924 | B1 * | 12/2017 | Wei | H02M 1/36 |
| 2009/0322083 | A1 * | 12/2009 | Wagoner | H02J 3/38 290/44 |
| 2012/0025604 | A1 * | 2/2012 | Baumann | H02J 3/36 307/9.1 |
| 2013/0128636 | A1 * | 5/2013 | Trainer | H02M 1/32 363/65 |
| 2013/0307324 | A1 * | 11/2013 | Johannsen | H02J 4/00 307/9.1 |
| 2013/0322132 | A1 * | 12/2013 | Wijekoon | H02M 5/297 363/37 |
| 2014/0346897 | A1 | 11/2014 | Wangeman et al. | |
| 2016/0039371 | A1 * | 2/2016 | Blumer | B60L 50/10 290/31 |

OTHER PUBLICATIONS

Moia et al., "Three-level NPC-based bidirectional PWM converter operation for high availability/power quality bipolar distribution networks," Conference: 2013 5th European Conference on Power Electronics and Applications (EPE) held on Sep. 2-6, 2013, at Lille, France, Electronic ISBN: 978-1-4799-0116-6, 10 pages.

Tafti et al., "Proportional-Resonant Controlled NPC Converter for More-Electric-Aircraft Starter-Generator," Conference: IEEE 11th International Conference on Power Electronics and Drive Systems (PEDS) held on Jun. 9-12, 2015, at Sydney, Australia, Electronic ISBN: 978-1-4799-4402-6, 6 pages.

Venkataramanan et al.,"Analysis of Aircraft Electric Microgrid System with Auxiliary Power Unit Using Real Time Simulation," Conference: Industrial Electronics (ISIE), 2015 IEEE 24th International Symposium on Industrial Electronics held on Jun. 3-5, 2015, at Buzios, Brazil, Electronic ISBN: 978-1-4673-7554-2, pp. 245-250.

Lopez et al., Space-Vector PWM With Common-Mode Voltage Elimination for Multiphase Drives, IEEE Transactions on Power Electronics, vol. 31, No. 12, Dec. 2016, pp. 8151-8161. Retrieved on Mar. 19, 2018. Retrieved at <https://www.researchgate.net/publication/291556262_Space_Vector_PWM_With_Common-Mode_Voltage_Elimination_for_Multiphase_Drives.>.

* cited by examiner

ELECTRICAL SUPPLY SYSTEM FOR AN AIRCRAFT WITH A LEGACY AC NETWORK AND A BIPOLAR DC NETWORK

CROSS-REFERENCE TO PRIORITY APPLICATION

This application claims the benefit of, and priority to, German patent application number DE 102017106924.0, filed Mar. 30, 2017. The content of the referenced application is incorporated by reference herein.

TECHNICAL FIELD

Embodiments of the subject matter described herein relate generally to an electrical supply system for an aircraft with a legacy AC network and a bipolar DC network, and to an aircraft having such an electrical supply system.

BACKGROUND

In modern aircraft it is a trend to include DC based electrical networks, in particular high voltage DC networks (HVDC). In doing so it is desired for weight-saving reasons to only provide a HVDC network and to use DC consumers in the aircraft and, if AC consuming devices are requested, to convert the DC voltage into a required AC voltage. Hence, a main converter, e.g. a TRU ("Transformer Rectifier Unit"), is fed with electrical power from engine-driven generators and provides a DC voltage into the HVDC network. To improve the safety of a HVDC network, a bipolar DC network is known. For the provision of the bipolar HVDC voltage, simplified generator circuits, which are also known as rectifiers or AC/DC convertors are required. Exemplarily, clamping the neutral point of a generator to ground is not required.

For example, patent publications DE 10 2013 209 544 A1 and US 2014/0346897 A1 illustrate a high-voltage DC voltage unit with a first DC voltage apparatus providing a first high-voltage DC voltage between a first output connection and a second output connection of the DC voltage apparatus or can be fed with a first high-voltage DC voltage. A second DC voltage apparatus provides a second high-voltage DC voltage or can be fed with a second high voltage DC voltage. A first DC voltage connection is coupled with the first output connection of the first DC voltage apparatus. A second DC voltage connection is coupled with the second output connection of the second DC voltage apparatus. A reference potential connection is coupled with the second output connection of the first DC voltage apparatus, with the first output connection of the second DC voltage apparatus and with an earth potential, the first and second high-voltage DC voltages realizing a bipolar power supply.

BRIEF SUMMARY

The use of AC consuming devices may sometimes be desired in an aircraft, which comprises a HVDC network. It is an object of the disclosure to propose an electrical supply system for an aircraft that has an improved or alternative capability of supplying AC consuming devices.

The object is met by an electrical supply system for an aircraft having the features of independent claim 1. Advantageous embodiments and further improvements may be gathered from the sub-claims and the following description.

An electrical supply system for an aircraft is proposed, the system comprising at least one generator having a plurality of phases and a neutral point; an AC network; a bipolar DC network; and a neutral point clamped converter. The at least one generator is designed for providing an AC voltage. The neutral point of the at least one generator is connected to ground in at least one mode of operation. The converter comprises an AC side having a plurality of AC connectors, each of which is couplable with at least one phase of the at least one generator; and a DC side having a first DC connector, a second DC connector and a neutral DC connector. The AC side of the converter is coupled with the at least one generator; the DC side is coupled with the bipolar DC network; and the neutral DC connector is connected to ground. The converter is designed for both providing a DC voltage on the DC side on receiving an AC voltage on the AC side and for providing an AC voltage on the AC side on receiving a DC voltage on the DC side.

The electrical supply system according to the disclosure therefore is able to provide electrical energy to two different individual networks, which may be installed in an aircraft, i.e. a legacy AC network as well as a bipolar DC network. Following a trend, modern aircraft may be equipped with more electrical systems, which may also require higher power. In doing so, electrical systems may be supplied with a DC voltage through a high voltage DC (HVDC) and preferably a bipolar HVDC network with ground return through the aircraft frame. By using such a setup, only two wires instead of three wires of usually three phases of an AC network, are required. This leads to a reduction in the weight of wiring, the number of wires, and total power losses in general.

However, it is conceivable that some aircraft operators may desire a remaining availability of a legacy AC network, e.g. with 115 V AC, e.g. for reusing existing commercial cabin equipment. This may particularly include electrical appliances in galleys, such as ovens, beverage makers, etc. Hence, the electrical supply system according to the disclosure allows to use both sorts of electrical consumers, be it one at a time or both at the same time.

Through using the converter, a bidirectional interface between the AC network and the DC network is given. Primarily, the DC network is provided with power from the AC network, which is supplied with power from the at least one generator. Due to the bidirectional character of the converter, it is also possible to supply the AC network with electrical power from the DC network instead of the at least one generator. Hence, not only the overall flexibility is improved for installing electrical consumers, but also the reliability is increased as the electrical supply system has an improved redundancy.

In this regard, the at least one generator may be a three-phase generator that generates an alternating voltage with a frequency that may vary in a range of e.g. 380 to 800 Hz, depending on the rotational speed of the engine, to which the at least one generator is coupled. Of course, generators with more or less phases may be used, depending on the requirements of the aircraft operator or other conditions. The AC network may be directly connected to the at least one generator, which leads to a simple and reliable generation of electrical power. The consumers connected to the AC network will, however, most likely depend on individual converters.

The bipolar DC network comprises two separate conductors in form of a cable or rail each as well as a ground conductor, which may be realized by the aircraft structure itself, a shield or a dedicated third wire, which may likely be the case on an aircraft having a CFRP structure. Both above-mentioned conductors have an opposite polarity, but the same potential with respect to ground. Since the individual potential to ground may be limited to 270 V, the risk of an arc flash incidence can be minimized. It is suggested to install both these conductors with a sufficient distance to each other to avoid an arcing incidence when the insulation of the conductors is broken. Electrical consumers may be supplied with power from just one or both conductors, e.g. depending on the individual power requirements.

The neutral point, which is a common neutral point of all phases, of the at least one generator is connected to ground in at least one mode of operation. The respective modes of operation may particularly include a normal operation, such as during cruise flight with all systems intact. While in general it is not required for DC networks to connect the neutral point of the at least one generator to ground, which is explained further below, it is common practice for doing so in AC networks. Due to the use of both types of network, i.e. AC and DC, the neutral point is connected to ground in the context of the present disclosure.

The converter is to be understood as an inverting device that converts an AC voltage having a certain frequency and a certain voltage level to a DC voltage with a desired voltage level and vice versa. The converter is a core component of the electrical supply system according to the disclosure as it allows to conduct a bidirectional flow of electrical power between the individual networks. For providing a DC voltage, the converter may simply work as a rectifier, e.g. as an active rectifier, which is synchronized to the sinusoidal AC voltage. In the other direction of power flow, the converter needs to convert the delivered voltage into an alternating voltage substantially having the shape of a sinewave.

The use of the converter leads to several benefits. First of all, the generator is able to provide power to a legacy AC network, while the advantages of a bipolar high voltage DC network for operating DC based electrical systems can be achieved at the same time, in particular the reduction of electrical losses. It is possible to start an auxiliary power unit (APU) or the at least one engine from a power source, such as a battery, in the bipolar DC network using the same converter. Further, the AC network can be supplied from the DC network as a backup in general. Still further, the bipolar DC network can be operated in a "degraded" unipolar mode, providing a clearly increased level of redundancy of the high voltage DC aircraft network. This may be advantageous if one of both conductors experiences an undesired event, such as through a short circuit in a defective device connected to the respective conductor.

While multi-level NPC converters may be a feasible solution for realizing the converter, other topologies may also be suitable. For example, the converter may be based on a modular multilevel converter, such as an M2C or MMC, or a cascaded H-bridge converter.

To sum up, the disclosure provides an interface of a legacy AC aircraft network to a bipolar HVDC aircraft network with very low weight and bidirectional power transfer capability.

In an advantageous embodiment, the converter is a multi-level neutral point clamped converter (multi-level NPC converter). Such a multi-level NPC converter usually comprises an array of power semiconductors and capacitors, which allow to provide rather high voltages at an output, while the individual power semiconductors are only faced with lower voltages depending on its number of levels. For example, for each level, two clamp diodes and four switching cells are used for connecting a single generator phase to one of both conductors of the DC network just for an instant, when the AC voltage of the respected phase comprises a matching polarity. Based on the arrangement of the switching cells and diodes it is possible to lead only a fraction of the AC voltage or the whole AC voltage to the respective DC conductor in order to influence the voltage level and to provide a most even DC voltage as possible. Due to the varying level of the momentary voltage of each phase on the AC side and possibly a variable frequency as well, the switching cells have to be synchronized with the AC current in order to provide the desired switching of the voltages to the bipolar DC network. Hence, the switching cells conduct a certain switching pattern that matches the voltage course on the AC side. On the other hand, such a converter allows to simply create an AC voltage on being supplied with a DC voltage through adapting the switching pattern of the switching cells to this purpose. The advantage of using such a multi-level NPC converter lies in the extremely low weight and the ability to be reconfigured to be flexibly adaptable to literally any voltage level and frequency. Through using a plurality of levels, the quality of the DC voltage as well as of the AC voltage can be improved. Here, particularly for aircraft operation, a trade-off between the desired quality and weight is suggested. A good power quality and a low filter weight may be achieved.

In a further embodiment, the system further comprises a first switch and a second switch. The first switch is arranged between the at least one generator and the converter to selectively interrupt a connection of the at least one generator and the converter. The second switch is arranged between the generator and the AC network to selectively interrupt a connection of the at least one generator to the AC network. Through the first switch, the operation of the bipolar DC network may selectively be interrupted or separated from the AC network completely. This may be advantageous in case an undesired event is detected in the AC network or at the at least one generator, while another power source is present on the DC network. The DC network may then be isolated through opening the connection between the AC side of the converter and the at least one generator. In general, this task helps avoiding both power sources to interfere. However, this may also be conducted in case the generator or a consumer in the AC network experiences a failure or in case the AC network does not need to be operated at all. The second switch in turn separates the generator from the AC network in case the AC network is supplied with electrical power through the DC network or in case the AC network is not in operation.

To separate a part of the electrical supply system, in which a fault occurs, from the remaining part of the electrical supply system, the electrical supply system may further comprise a third switch, which is arranged between a first branch point between the first switch and the AC side of the converter and a second branch point between the second switch and the AC network to selectively provide a connection of the AC network to the AC side of the converter. This allows to directly connect the converter to the AC network when the generator is not used. Furthermore, it may be advantageous to open the first and the second switch at the same time.

In another exemplary embodiment, the electrical supply system further comprises a first filter connected to the AC side of the converter, wherein the first filter is designed for influencing the AC voltage delivered from the AC side or to the AC side of the converter to reach a predetermined voltage/power quality. The filter may be added to the AC side of the converter as a separate component or be integrated into the converter. The first filter may either be a static device, i.e. having components with fixed electrical conditions, or may be an active filter able to adapt to variable operating conditions. While other designs and setups are not excluded, LC-filters may be a feasible option.

In a still further embodiment, the electrical supply system further comprises a second filter arranged between the AC network and the at least one generator, wherein the second filter is designed for influencing the AC voltage delivered into the AC network to reach a predetermined voltage/power quality. This second filter may simply be an option that harmonizes the AC power fed to the AC network.

As indicated above, the electrical supply system according to the present disclosure may further comprise an additional power supply device, which is designed for providing a DC voltage to the bipolar DC network. Besides batteries, DC generators and other devices, also fuel cell stacks are a conceivable option.

In another advantageous embodiment the converter is a three-level neutral point clamped converter. The additional third switching state can be used to create a pulse width modulation scheme, such that the ripple current through the neutral point is minimized and, consequently, the common mode voltage ripple is also minimized. A three-level neutral point may exemplarily be described in "Lopez et al.: Space Vector PWM With Common-Mode Voltage Elimination for Multiphase Drives, IEEE Transactions on Power Electronics, December 2016".

In another embodiment the converter is a two-level converter. It is possible to generate a bipolar HVDC network from a legacy AC aircraft network with generator neutral connected to ground by using such a fundamental circuit configuration. Here, a certain common mode voltage ripple may be experienced on the DC port, which may also depend on the DC load. However, this converter type is very simple in its design and cost-efficient.

Embodiments of the invention further relate to an aircraft having an electrical supply unit according to the above description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
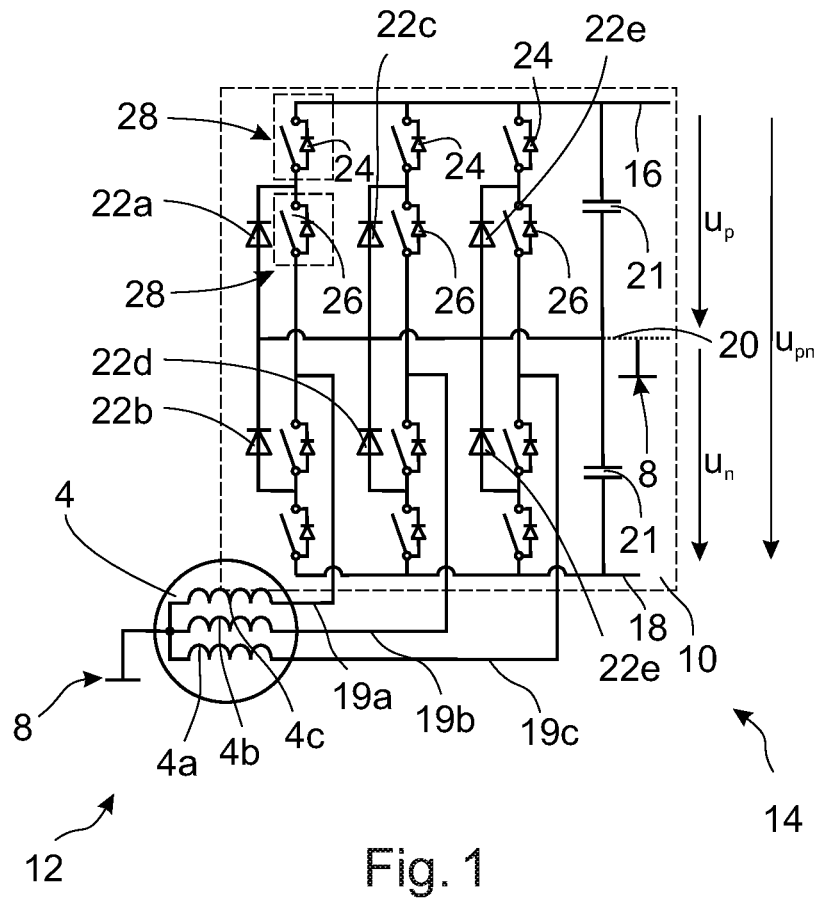
FIG. 1 shows an electrical supply system in a simplified, schematic view.

FIG. 1 shows an electrical supply system 2 in a strongly simplified, schematic view. Here, an engine-driven generator 4 is indicated only through three phases 4a, 4b and 4c, which constitute a star circuit having a neutral point 6, which is connected to ground 8. Such a circuit is commonly found in aircraft having AC networks.

However, in this exemplary embodiment the generator 4 feeds an AC voltage to an electrical converter 10, which is chosen to be a three-level (A)NPC converter in which the neutral is connected to ground. A multilevel converter with a higher number of levels is also possible. The generator 4 is coupled with an AC side 12 of the converter 10, which also has a DC side 14 comprising a first pole or first DC connector 16, a second pole or second DC connector 18 as well neutral point or neutral DC connector 20, which in turn is connected to ground 8. The first pole 16 may comprise a positive voltage Up, such as 270 V, relative to ground 20. The second pole 18 has a negative voltage Un, which may be −270V relative to the ground 20.

For each of exemplarily three levels, the converter 10 comprises two clamping diodes 22a, 22b, 22c, 22e, 22f and 22g and four switching cells 28 are used for connecting a single generator phase 4a, 4b and 4c to one of both poles 16 and 18 only for an instant, when an AC voltage delivered by the respective phase 4a, 4b and 4c comprises a matching polarity. The switching cells 28 each serve as a bidirectional switch through components 24 and 26, which may both be realized as semiconductors.

The clamping diodes 22a to 22f allow having zero voltage at AC connectors 19a, 19b, 19c of the converter 10. This is conducted when the inner switching cells in the converter shown in FIG. 1 are closed, which leads to connecting the respective phase to ground. If the converter 10 is synchronized through PWM, the ratio between switching intervals to cycle duration or periodic time is chosen in a way that the desired voltage is provided in an average.

DC link capacitors 21 between the positive pole 16 and ground 8 as well as between negative pole 18 and ground 8 allow to harmonize the current delivered by the converter 10.

Based on the arrangement of the switching cells 28 and clamping diodes 22a to 22f it is possible to lead only a fraction of the AC voltage or the whole AC voltage to the respective DC pole 16 or 18. It is to be understood that the switching action of the switching cells 28 must be synchronized with the AC current, such that the voltage delivered on the poles 16 and 18 provide the desired voltage level. As a result, the switching cells 28 provide a switching pattern that matches the voltage course on the AC side. At the same time, the converter 10 may provide an AC voltage based on a DC voltage applied to the poles 16 and 18 through adapting the switching pattern of the switching cells 28 to this purpose.

Figure 2:
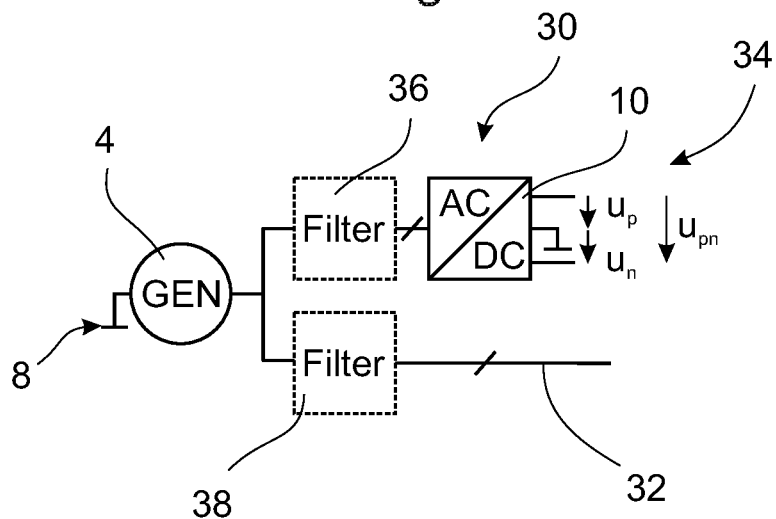
FIG. 2 shows a modified electrical supply system having additional filters in a schematic view.

FIG. 2 shows a modified supply system 30 having a converter 10, a generator 4, an AC network 32 as well as a bipolar DC network 34. In addition to the components shown in FIG. 1, a first filter 36 is present, which is arranged between the generator 4 and the AC side 12 of the converter 10. The first filter 36 comprises a set of components that allow to influence the AC voltage delivered from the AC side 12 or to the AC side 12 of the converter 10 to reach a predetermined voltage/power quality. For example, ripples may be cleared off and the waveform of the AC voltage is harmonized. This may be commonly conducted through the use of capacitors and inductances.

A second filter 38 may be arranged between the generator 4 and the AC network 32 and may provide the same function, i.e. influencing the AC voltage delivered into the AC network 32 to reach a predetermined voltage/power quality. This may also be conducted by common components, such as capacitors and inductances for clearing off ripples and harmonizing the AC waveform.

Figure 3:
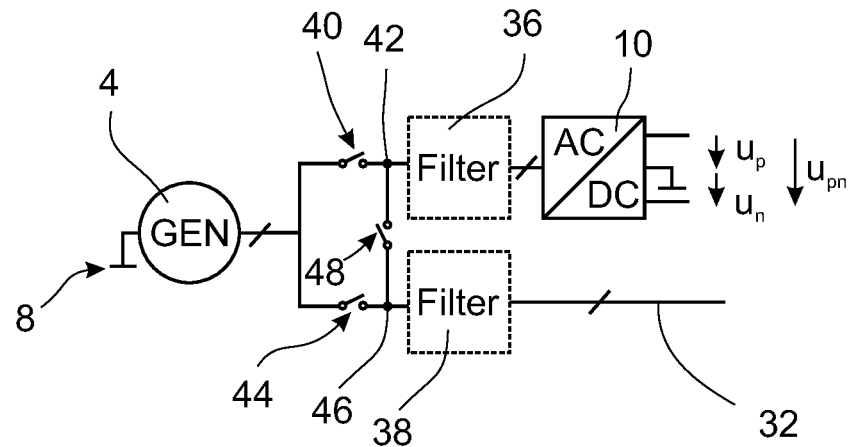
FIG. 3 shows a further modified electrical supply system having additional switches in a schematic view.

FIG. 3 provides a further option in form of a first switch 40 arranged between the generator 4 and a first branch point 42 between the generator 4 and the AC side 12 of the converter 10. A second switch 44 is arranged between the generator 4 and a second branch point 46 between the generator 4 and the AC network 32. A third switch 48 may be arranged between the first branch point 42 and the second branch point 46.

The switches 40, 44 and 46 allow to operate the electrical system in several different modes of operation. The first switch 40 allows to isolate the DC network 34 from the generator 4. Depending on the state of the third switch 48 the DC network 34 may be operated through a power source installed in the DC network 34 itself or by a power source in the AC network 32, e.g. an APU-driven generator, if the third switch 48 is closed.

For example, the following operating modes are achievable:

|   | First Switch | Second Switch | Third Switch | Operating Modes |
|---|---|---|---|---|
| 1 | Open | Open | Open | DC and AC network are operated through individual power sources, generator inactive |
| 2 | Open | Open | Closed | Power transfer between DC and AC network, generator inactive |
| 3 | Open | Closed | Open | DC network may only be operated by individual power source, AC network operated through generator. Or electrical engine start: Generator in motor mode. |
| 4 | Open | Closed | Closed | DC and AC network operated by generator; engine start |
| 5 | Closed | Open | Open | DC network operated by generator, AC network may only be operated by individual power source or is deactivated; engine start |
| 6 | Closed | Open | Closed | DC and AC network operated by generator |
| 7 | Closed | Closed | Open | DC and AC network operated by generator |
| 8 | Closed | Closed | Closed | DC and AC network operated by generator |

The scenarios 4, 6, 7 and 8 lead to the same operating mode, since both the converter 10 and the AC network 32 are supplied with the AC voltage from the generator 4 due to the chosen position of the switches 40, 44, 48. In at least one mode of operation, the generator may be disabled, e.g. due to the engines not having started yet. If the generator 4 is a starter/generator, preferably the DC network may deliver power to the generator in order to start the engine associated with it. This may be associated preferably with scenario 5. However, also the AC network may stay connected to the converter 10, hence scenarios 4 and 6-8 may also be used for starting the engine.

If the generator fails it should be disconnected from both the converter and the AC network, which may relate to scenarios 1 and 2.

In scenario 2, the converter has to supply the DC network while providing the same characteristics to the AC network as the generator 4, for example to operate single-phase-loads that are connected to neutral/ground.

Figure 4:
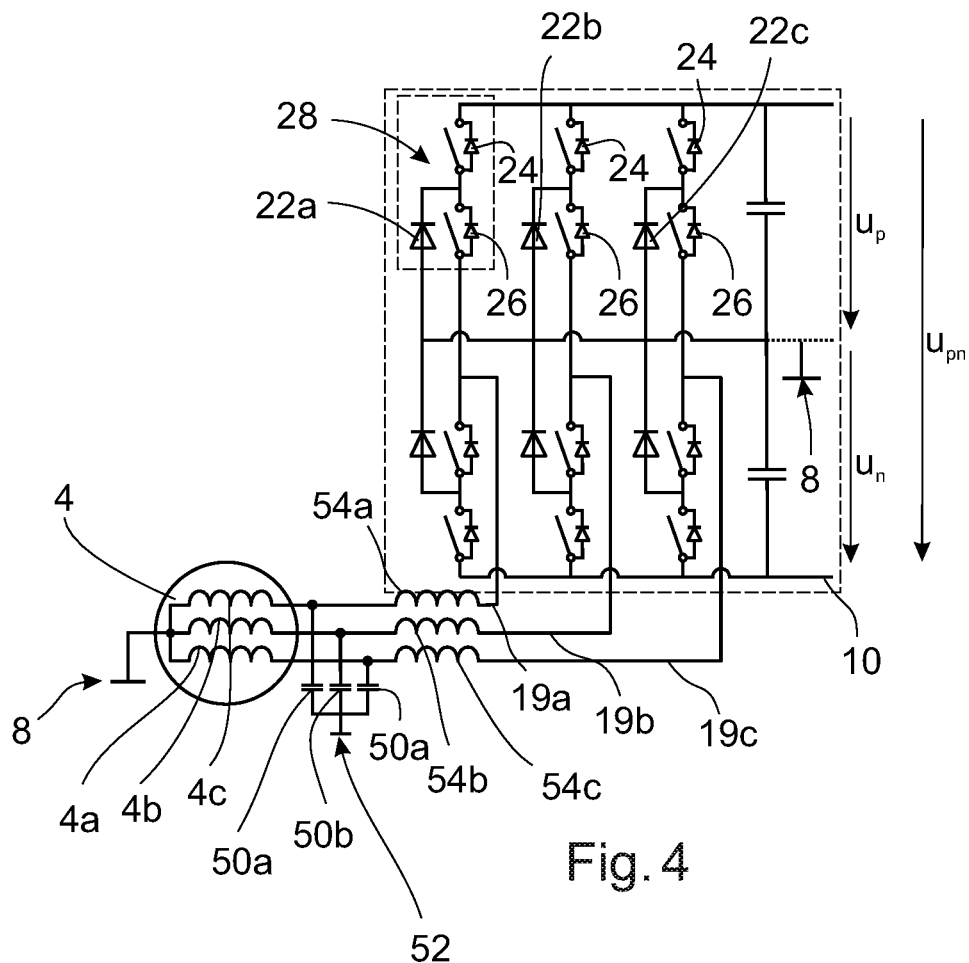
FIG. 4 shows an example of a filter in a strongly simplified electrical supply system in a schematic view. Only the first upper filter from FIG. 3 is shown here.

FIG. 4 shows, in addition to the illustration in FIG. 1, an exemplary setup of a first filter 36 in form of an LC filter. Here, each phase 4a, 4b and 4c coming from the generator 4 is coupled with a capacitor 50a, 50b or 50c, which are connected to ground 52 in a parallel connection. For each phase 4a, 4b and 4c an individual inductance 54a, 54b and 54c is provided in a series connection with the AC side 12 of the converter 10. By designing the capacitors 50a, 50b and 50c as well as the inductances 54a, 54b and 54c according to the expected operating conditions, the AC voltage delivered to the AC side 12 or coming from the AC side 12 is harmonized.

Figure 5:
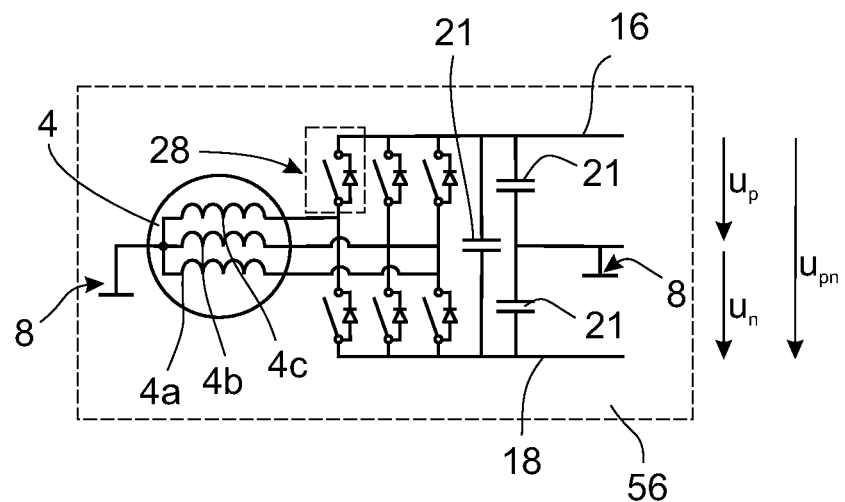
FIG. 5 shows a further modified electrical supply system having a two-level inverter.

FIG. 5 shows another converter 56, which is realized in form of a two-level converter. Here, a simpler setup of two switching cells 28 per phase 4a, 4b and 4c is used, which are directly connected to the respective phase. DC link capacitors 21 arranged between the positive pole 16 and ground 8, between negative pole 18 and ground 8 as well as between both poles 16 and 18 harmonize the current delivered on both poles 16 and 18. As mentioned before, the DC voltage delivered by such a converter 56 may have a more or less distinct ripple, but may be less costly.

Figure 6:
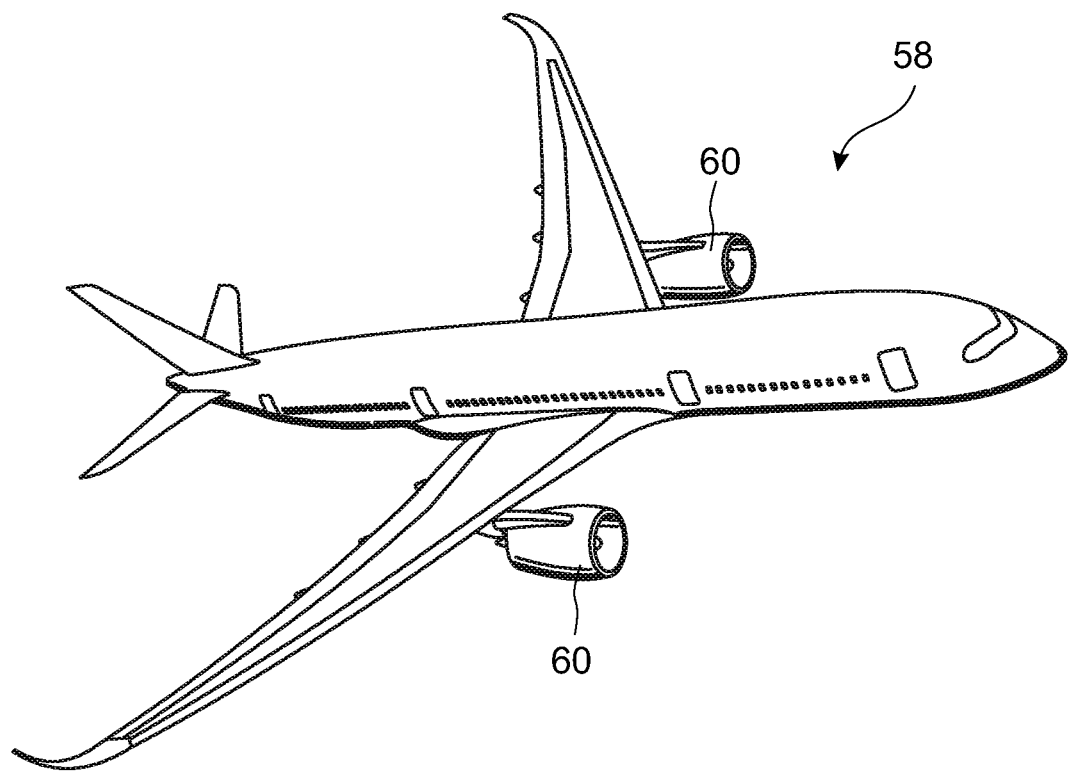
FIG. 6 shows an aircraft with such an electrical supply system.

FIG. 6 shows an aircraft 58 having two engines 60 that may drive at least one generator 4 each. In this exemplary embodiment, the aircraft 58 comprises an electrical supply system according to the above description.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electrical supply system for an aircraft, comprising:
a generator having a plurality of phases and a neutral point;
an AC network;
a bi polar DC network; and
a neutral point clamped converter;
wherein the generator provides an AC voltage;
wherein the neutral point of the generator is connected to ground, in at least one mode of operation;
wherein the converter comprises an AC side having a plurality of AC connectors, each of which is couplable with at least one phase of the generator, and comprises a DC side having a first DC connector, a second DC connector and a neutral DC connector;
wherein the AC side of the converter is coupled with the generator, the DC side is coupled with the bipolar DC network, and the neutral DC connector is connected to ground; and
wherein the convertor provides a DC voltage on the DC side upon receiving an AC voltage on the AC side, and provides an AC voltage on the AC side upon receiving a DC voltage on the DC side,
further comprising a first switch and a second switch, wherein the first switch is arranged directly between the generator and the converter to selectively interrupt a connection of the generator and the converter, independent of a position of the second switch, and wherein the second switch is arranged directly between the generator and the AC network to selectively interrupt a connection of the generator to the AC network, independent of a position of the first switch, and
a third switch, wherein the third switch is arranged between a first branch point between the first switch and the AC side of the converter and a second branch point between the second switch and the AC network to selectively provide a connection of the AC network to the AC side of the converter.

2. The electrical supply system of claim 1, wherein the converter is a multilevel neutral point clamped converter.

3. The electrical supply system of claim 1, further comprising a first filter arranged between the generator and the AC side of the converter, wherein the first filter is configured to receive an unmodified AC current from the generator and to influence the AC voltage delivered from the AC side or to the AC side of the converter to reach a predetermined voltage/power quality.

4. The electrical supply system of claim 3, further comprising a second filter arranged between the AC network and the generator, wherein the second filter is configured to receive an unmodified AC current from the generator and to influence the AC voltage delivered into the AC network to reach a predetermined voltage/power quality.

5. The electrical supply system of claim 1, further comprising an additional power supply device to provide a DC voltage to the bipolar DC network.

6. The electrical supply system of claim 1, wherein the converter is a three-level neutral point clamped converter.

7. The electrical supply system of claim 1, wherein the converter is a two-level converter.

8. An aircraft comprising an electrical supply system, the electrical supply system comprising:
a generator having a plurality of phases and a neutral point;
an AC network;
a bi polar DC network; and
a neutral point clamped converter;
wherein the generator provides an AC voltage;
wherein the neutral point of the generator is connected to ground, in at least one mode of operation;
wherein the converter comprises an AC side having a plurality of AC connectors, each of which is couplable with at least one phase of the generator, and comprises a DC side having a first DC connector, a second DC connector and a neutral DC connector;
wherein the AC side of the converter is coupled with the generator, the DC side is coupled with the bipolar DC network, and the neutral DC connector is connected to ground; and
wherein the convertor provides a DC voltage on the DC side upon receiving an AC voltage on the AC side, and provides an AC voltage on the AC side upon receiving a DC voltage on the DC side,
further comprising a first switch and a second switch, wherein the first switch is arranged directly between the generator and the converter to selectively interrupt a connection of the generator and the converter, independent of a position of the second switch, and wherein the second switch is arranged directly between the generator and the AC network to selectively interrupt a connection of the generator to the AC network, independent of a position of the first switch, and
a third switch, wherein the third switch is arranged between a first branch point between the first switch and the AC side of the converter and a second branch point between the second switch and the AC network to selectively provide a connection of the AC network to the AC side of the converter.

* * * * *